United States Patent
Olgierd et al.

(10) Patent No.: US 11,648,525 B2
(45) Date of Patent: May 16, 2023

(54) REACTION METHOD FOR FORMING LIQUID-PHASE CONCENTRIC LAYERS BY ROTARY REACTOR AND REACTION SYSTEM INCLUDING FORMED LIQUID-PHASE CONCENTRIC LAYERS

(71) Applicants: INSTITUTE FOR BASIC SCIENCE, Daejeon (KR); UNIST(ULSAN NATIONAL INSTITUTE OF SCIENCE AND TECHNOLOGY), Ulsan (KR)

(72) Inventors: Cybulski Olgierd, Ulsan (KR); Dygas Miroslaw, Ulsan (KR); Mikulak-klucznik Barbara, Ulsan (KR); Sobolev Yaroslav, Ulsan (KR); Grzybowski Bartosz A, Ulsan (KR)

(73) Assignees: INSTITUTE FOR BASIC SCIENCE, Daejeon (KR); UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 0 days.

(21) Appl. No.: 17/424,996

(22) PCT Filed: Jan. 22, 2020

(86) PCT No.: PCT/KR2020/001069
§ 371 (c)(1),
(2) Date: Jul. 22, 2021

(87) PCT Pub. No.: WO2020/153739
PCT Pub. Date: Jul. 30, 2020

(65) Prior Publication Data
US 2022/0126262 A1    Apr. 28, 2022

(30) Foreign Application Priority Data

Jan. 22, 2019 (KR) .................. 10-2019-0008251
Jan. 21, 2020 (KR) .................. 10-2020-0007988

(51) Int. Cl.
*B01J 19/28* (2006.01)
*B01J 19/00* (2006.01)

(52) U.S. Cl.
CPC .......... *B01J 19/28* (2013.01); *B01J 19/0053* (2013.01); *B01J 2219/1943* (2013.01)

(58) Field of Classification Search
CPC . B01J 19/28; B01J 19/0053; B01J 2219/1943
See application file for complete search history.

(56) References Cited

FOREIGN PATENT DOCUMENTS

| JP | 2001-46865 A | 2/2001 |
| JP | 2013-512449 A | 4/2013 |

(Continued)

OTHER PUBLICATIONS

International Search Report dated Apr. 29, 2020 for corresponding International Patent Application No. PCT/KR2020/001069.
(Continued)

*Primary Examiner* — Lessanework Seifu
(74) *Attorney, Agent, or Firm* — Hauptman Ham, LLP

(57) ABSTRACT

The present invention relates to a reaction method for forming a layered structure of immiscible liquid-phase concentric layers within a rotary reactor and a reaction system including the layered structure, and may provide a basis capable of efficiently performing a multistage reaction in terms of time and space.

11 Claims, 9 Drawing Sheets

(a)

(b)

(56) References Cited

FOREIGN PATENT DOCUMENTS

KR   10-2012-0114847 A   10/2012
KR   10-2016-0121159 A   10/2016

OTHER PUBLICATIONS

Written Opinion dated Apr. 29, 2020 for corresponding International Patent Application No. PCT/KR2020/001069.
Ian R. Baxendale, "The integration of flow reactors into synthetic organic chemistry," Journal of Chemical Technology and Biotechnology, 2013, vol. 88, pp. 519-552, cited in NPL Nos. 1 and 2.
Pattle, R.E., "Systems of mutually immiscible liquid layers," Nature, Feb. 4, 1950, No. 4188, vol. 165, pp. 203-204, cited in the Specification.
Joel H. Hildebrand, "Seven Liquid Phases in Equilibrium," J. Phys. Chem., 1949, vol. 53, pp. 944-947, cited in the Specification.
Jens Eckelmann et al., "Mixing Liquids—Mission Impossible? A Colorful Demonstration on Immiscible Systems," Journal of Chemical Education, 2013, vol. 90, pp. 224-227, cited in the Specification.
Philip J. Kitson et al., "Digitization of multistep organic synthesis in reactionware for on-demand pharmaceuticals," Science, Jan. 19, 2018, vol. 359, pp. 314-319, cited in the Specification.
Ryan L. Hartman et al., "Deciding Whether To Go with the Flow: Evaluating the Merits of Flow Reactors for Synthesis," Angew. Chem. Int. Ed., 2011, vol. 50, pp. 7502-7519, cited in the Specification.
Julio C. Pastre et al., "Flow chemistry syntheses of natural products," Chem. Soc. Rev., 2013, vol. 23, pp. 8849-8869, cited in the Specification.

REACTION METHOD FOR FORMING LIQUID-PHASE CONCENTRIC LAYERS BY ROTARY REACTOR AND REACTION SYSTEM INCLUDING FORMED LIQUID-PHASE CONCENTRIC LAYERS

CROSS-REFERENCE TO RELATED APPLICATION

The present application is a national stage filing under 35 U.S.C § 371 of PCT application number PCT/KR2020/001069 filed on Jan. 22, 2020 which is based upon and claims the benefit of priorities to Korean Patent Application No. 10-2019-0008251, filed on Jan. 22, 2019; and Korean Patent Application No. 10-2020-0007988, filed on Jan. 21, 2020 in the Korean Intellectual Property Office, which are incorporated herein in their entireties by reference.

TECHNICAL FIELD

The present invention relates to a reaction method for forming a layered structure of immiscible liquid-phase concentric layers within a rotary reactor.

The present invention also relates to a reaction system including immiscible liquid-phase concentric layers formed within a rotary reactor.

BACKGROUND ART

Non-Patent Documents 1, 2 and 3 disclose layered structures of immiscible liquid-phase layers, but in the conventional layered structure, there is a problem that stability is not sufficient, for example, liquid-phase layers that are not adjacent to each other may be merged with each other.

Meanwhile, Non-Patent Documents 4, 5 and 6 relate to a conventional reaction system for a multistage reaction such as a multistage organic synthesis reaction, but it is difficult to efficiently perform the multistage reaction in terms of time and space, and a significantly delicate manipulation is required.

Non-Patent Document

1. Pattle, R. E., Systems of mutually immiscible liquid layers, Nature 165, 203-204 (1950).
2. Hildebrand, J. H. Seven liquid phases in equilibrium. J. Phys. Chem. 53, 944-947 (1949).
3. Eckelmann, J., Luening, U. Mixing Liquids-Mission Impossible? A Colorful Demonstration on Immiscible Systems. J. Chem. Ed. 90, 224-227 (2013).
4. Kitson, P. J., Marie, G., Francoia, J. P., Zalesskiy, S. S., Sigerson, R. C., Mathieson, J. S., Cronin, L. Digitization of multistep organic synthesis in reactionware for on-demand pharmaceuticals. Science 359, 314-319 (2018).
5. Hartman, R. L., McMullen, J. P., Jensen, K. F. Deciding whether to go with the flow: Evaluating the merits of flow reactors for synthesis. Angew. Chem. Int. Ed. 50, 7502-7519 (2011).
6. Pastre, J. C., Browne, D. L., Ley, S. V., Flow chemistry syntheses of natural products. Chem. Soc. Rev. 23, 8849-8869 (2013).

DISCLOSURE

Technical Problem

An object of the present invention is to provide a basis capable of efficiently performing a multistage reaction in terms of time and space by forming a stable layered structure of immiscible liquid-phase layers within a rotary reactor.

Technical Solution

In one general aspect, a reaction method using a rotary reactor including a cylindrical reactor; and a drive unit rotating the cylindrical reactor includes:

sequentially and adjacently forming a first liquid-phase concentric layer to an m-th liquid-phase concentric layer (here, m is an integer of 2 or more) in order adjacent or close to an inner side surface of the cylindrical reactor by a centrifugal force due to rotation of the cylindrical reactor by sequentially injecting a first liquid-phase material to an n-th liquid-phase material (here, n is an integer of 2 or more) into the cylindrical reactor that is rotating, wherein the larger the value of n, the smaller the density of the liquid-phase material the larger the value of m, the smaller the density of the liquid-phase concentric layer, $n-m \geq 0$, the first liquid-phase material and the second liquid-phase material that are sequentially injected are immiscible with each other, and in a case where n is 3 or more, the third liquid-phase material and liquid-phase materials after the third liquid-phase material are miscible or immiscible with a liquid-phase material injected in the previous order, and liquid-phase concentric layers adjacent to each other among the formed liquid-phase concentric layers are immiscible with each other.

The respective liquid-phase materials may independently comprise one or more solvents, or comprise one or more solvents and one or more reactants.

At least one aqueous solution may be used in the first liquid-phase material to the n-th liquid-phase material, and at least one aqueous solution concentric layer may be provided in the first liquid-phase concentric layer to the m-th liquid-phase concentric layer.

The cylindrical reactor may have a diameter of 60 to 200 mm and a height of 5 to 55 mm.

A rotational speed of the cylindrical reactor may be 800 rpm or more.

A thickness of each of the liquid-phase concentric layers may be 150 µm or more.

A mandrel may be provided on a center of a bottom surface of an inner portion of the cylindrical reactor.

The liquid-phase materials may be injected into the cylindrical reactor through injection channels connected to an inlet of the mandrel and embedded into a lower portion of the bottom surface of the cylindrical reactor.

The liquid-phase materials may be injected into the cylindrical reactor through a main injection channel connected to an inlet of the mandrel and embedded into a lower portion of the bottom surface of the cylindrical reactor and two or more branched injection channels derived from the main injection channel.

The reaction method may further include generating a phase transfer between the adjacent liquid-phase concentric layers.

In another general aspect, a reaction system including liquid-phase concentric layers formed within a rotary reactor includes:

a cylindrical reactor that rotates;
a drive unit rotating the cylindrical reactor; and
a first liquid-phase concentric layer to an m-th liquid-phase concentric layer (here, m is an integer of 2 or more)

sequentially and adjacently formed in order adjacent or close to an inner side surface of the cylindrical reactor, wherein the liquid-phase concentric layers are sequentially and adjacently formed by a centrifugal force due to rotation of the cylindrical reactor by sequentially injecting a first liquid-phase material to an n-th liquid-phase material (here, n is an integer of 2 or more) into the cylindrical reactor that is rotating, the larger the value of n, the smaller the density of the liquid-phase material, the larger the value of m, the smaller the density of the liquid-phase concentric layer, $n-m \geq 0$, the first liquid-phase material and the second liquid-phase material that are sequentially injected are immiscible with each other, and in a case where n is 3 or more, the third liquid-phase material and liquid-phase materials after the third liquid-phase material are miscible or immiscible with a liquid-phase material injected in the previous order, and liquid-phase concentric layers adjacent to each other among the formed liquid-phase concentric layers are immiscible with each other.

Advantageous Effects

In the reaction method and the reaction system according to the present invention using the rotary reactor, a layered structure of immiscible liquid-phase concentric layers may be formed, and modifications of extraction, miscible material addition, and the like, may be applied to a specific concentric layer without damaging the entire layered structure of the liquid-phase concentric layers.

In addition, in the reaction method and the reaction system according to the present invention, the phase transfer may be generated between the adjacent liquid-phase concentric layers, and thus, a multistage reaction such as a multistage organic synthesis reaction may be efficiently performed in terms of time and space.

BEST MODE

Hereinafter, a reaction method according to the present invention will be described in detail with reference to the accompanying drawings. The present invention may be variously modified and have several forms. Therefore, specific embodiments of the present invention will be illustrated in the accompanying drawings and be described in detail in the present specification. However, it is to be understood that the present invention is not limited to a specific disclosed form, but includes all modifications, equivalents, and substitutions without departing from the scope and spirit of the present invention.

Unless defined otherwise, it is to be understood that all the terms used in the present specification including technical and scientific terms have the same meanings as those generally understood by those skilled in the art to which the present invention pertains. Terms generally used and defined by a dictionary should be interpreted as having the same meanings as meanings within a context of the related art and should not be interpreted as having ideal or excessively formal meanings unless clearly defined otherwise in the present invention.

Throughout the present specification, unless described otherwise, "including" any component will be understood to imply the inclusion of other elements rather than the exclusion of other elements.

The present invention provides a reaction method using a rotary reactor including a cylindrical reactor; and a drive unit rotating the cylindrical reactor, including:

sequentially and adjacently forming a first liquid-phase concentric layer to an m-th liquid-phase concentric layer (here, m is an integer of 2 or more) in order adjacent or close to an inner side surface of the cylindrical reactor by a centrifugal force due to rotation of the cylindrical reactor by sequentially injecting a first liquid-phase material to an n-th liquid-phase material (here, n is an integer of 2 or more) into the cylindrical reactor that is rotating, wherein the larger the value of n, the smaller the density of the liquid-phase material, the larger the value of m, the smaller the density of the liquid-phase concentric layer, $n-m \geq 0$, the first liquid-phase material and the second liquid-phase material that are sequentially injected are immiscible with each other, and in a case where n is 3 or more, the third liquid-phase material and liquid-phase materials after the third liquid-phase material are miscible or immiscible with a liquid-phase material injected in the previous order, and liquid-phase concentric layers adjacent to each other among the formed liquid-phase concentric layers are immiscible with each other.

Figure 1:
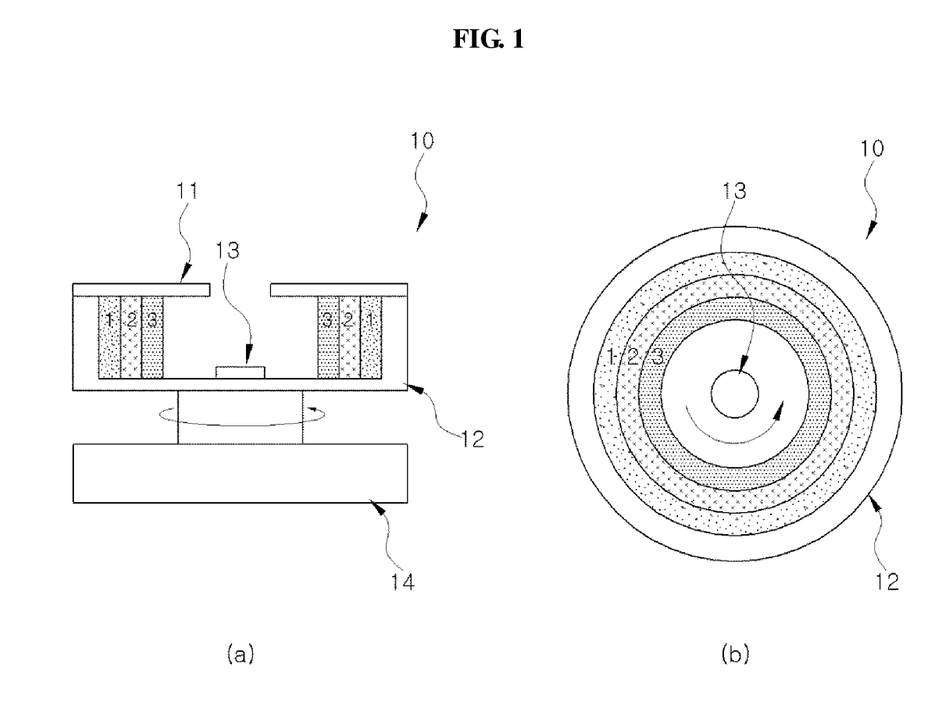
FIG. 1 illustrates a cross-sectional view (a) and a main part plan view (b) for describing a rotary reactor and a layered structure according to a non-restrictive embodiment of the present invention.
Figure 2:
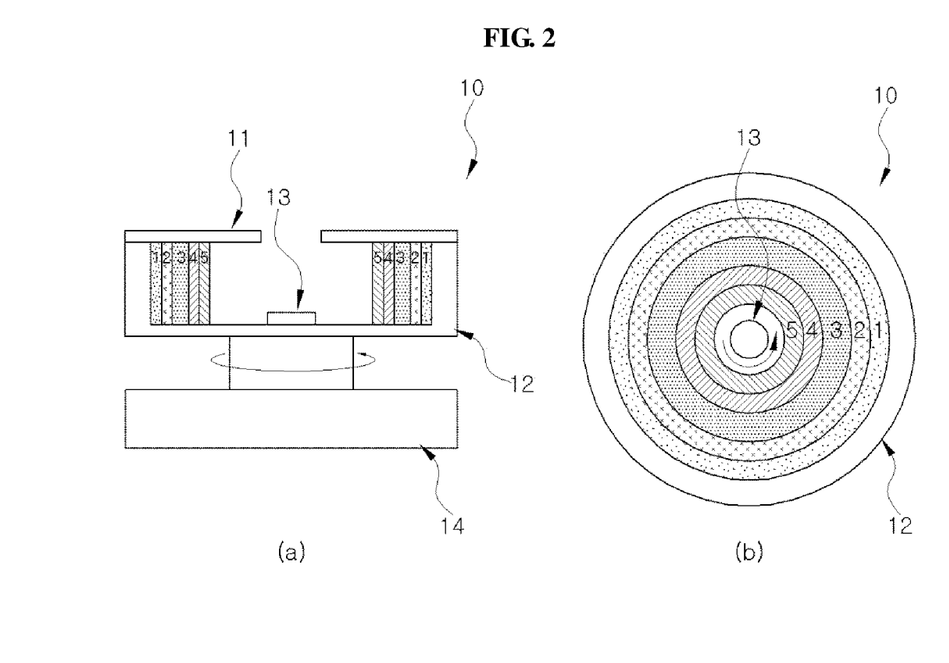
FIG. 2 illustrates a cross-sectional view (a) and a main part plan view (b) for describing a rotary reactor and a layered structure according to a non-restrictive embodiment of the present invention.
Figure 3:
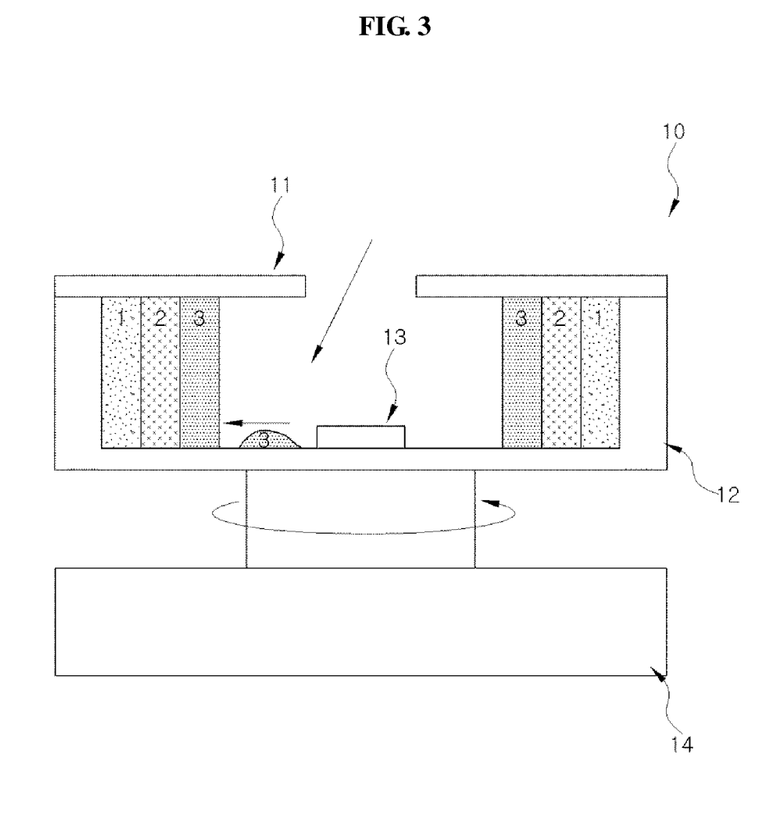
FIG. 3 illustrates a method of injecting a liquid-phase material for forming a liquid-phase concentric layer according to a non-restrictive embodiment of the present invention.

As illustrated in FIGS. 1A, 2A and 3 according to non-restrictive embodiments of the present invention, a rotary reactor 10 used in a reaction method according to the present invention includes a cylindrical reactor 12; and a driving unit 14 rotating the cylindrical reactor.

The cylindrical reactor may be made of a material having a cylindrical shape, and the material may be one or two or more selected from the group consisting of $SiN_x$, $SiO_2$, $TiO_2$, quartz, and Teflon (polytetrafluoroethylene), but is not limited thereto.

In sequentially injecting the first liquid-phase material to the n-th liquid-phase material (here, n is an integer of 2 or more) into the cylindrical reactor that is rotating, the larger the value of n, the smaller the density of the liquid-phase material, and n may be preferably an integer of 2 to 20. As illustrated in FIGS. 1A, 2A and 3, the respective liquid-phase materials may be injected into the cylindrical reactor through an injection portion positioned at the center of a cylindrical reactor plug 11, and the respective liquid-phase materials may be dropped onto a bottom surface of an inner portion of the cylindrical reactor using a syringe (FIG. 3), but are not limited thereto.

A material of the cylindrical reactor plug may be one or two or more selected from the group consisting of $SiN_x$, $SiO_2$, $TiO_2$, and quartz, but is not limited thereto.

The first liquid-phase material and the second liquid-phase material that are sequentially injected into the cylindrical reactor that is rotating are immiscible with each other, and in a case where n is 3 or more, the third liquid-phase material and the liquid-phase materials after the third liquid-phase material are miscible or immiscible with the liquid-phase material injected in the previous order. As a non-restrictive example, in a case where the first liquid-phase material to the third liquid-phase material are sequentially injected into the cylindrical reactor (density: first liquid-phase material>second liquid-phase material>third liquid-phase material), the first liquid-phase material and the second liquid-phase material are immiscible with each other, and the second liquid-phase material and the third liquid-phase material are miscible or immiscible with each other. As another non-restrictive example, in a case where the first liquid-phase material to a fourth liquid-phase material are sequentially injected into the cylindrical reactor (density: first liquid-phase material>second liquid-phase material>third liquid-phase material>fourth liquid-phase material), the first liquid-phase material and the second liquid-phase material are immiscible with each other, the second liquid-phase material and the third liquid-phase material are miscible or immiscible with each other, and the third liquid-phase material and the fourth liquid-phase material are miscible or immiscible with each other.

The respective liquid-phase materials injected into the cylindrical reactor that is rotating may independently comprise one or more solvents or comprise one or more solvents and one or more reactants. As a non-restrictive example, in a case where the first liquid-phase material to the third liquid-phase material are sequentially injected into the cylindrical reactor (density: first liquid-phase material>second liquid-phase material>third liquid-phase material), the first liquid-phase material comprises one solvent, the second liquid-phase material comprises one solvent and one reactant, and the third liquid-phase material comprises one solvent. As another non-restrictive example, in a case where the first liquid-phase material to the fourth liquid-phase material are sequentially injected into the cylindrical reactor (density: first liquid-phase material>second liquid-phase material>third liquid-phase material>fourth liquid-phase material), the first liquid-phase material comprises one solvent and one reactant, the second liquid-phase material comprises one solvent and one reactant, the third liquid-phase material comprises one solvent and one reactant, and the fourth liquid-phase material comprises one solvent and one reactant.

The first liquid-phase concentric layer to the m-th liquid-phase concentric layer (here, m is an integer of 2 or more) are sequentially and adjacently formed in order adjacent or close to the inner side surface of the cylindrical reactor by the centrifugal force due to the rotation of the cylindrical reactor by sequentially injecting the first liquid-phase material to the n-th liquid-phase material (here, n is an integer of 2 or more) into the cylindrical reactor that is rotating. The larger the value of m, the smaller the density of the liquid-phase concentric layer, and m may be preferably an integer of 2 to 20.

$n-m \geq 0$, and n−m may be, for example, 0 or 1.

When the first liquid-phase material to the n-th liquid-phase material are sequentially injected into the cylindrical reactor that is rotating, one liquid-phase material or two or more miscible liquid-phase materials that are sequentially injected form one liquid-phase concentric layer. As illustrated in FIGS. 1A and 1B according to a non-restrictive embodiment of the present invention, in a case where the first liquid-phase material to the third liquid-phase material are sequentially injected into the cylindrical reactor (density: first liquid-phase material>second liquid-phase material>third liquid-phase material, the first liquid-phase material and the second liquid-phase material are immiscible with each other, and the second liquid-phase material and the third liquid-phase material are immiscible with each other), the first liquid-phase material first injected into the cylindrical reactor forms a first liquid-phase concentric layer 1 adjacent to an inner side surface of the cylindrical reactor, the second liquid-phase material second injected into the cylindrical reactor forms a second liquid-phase concentric layer 2 adjacent to the first liquid-phase concentric layer, and the third liquid-phase material last injected into the cylindrical reactor forms a third liquid-phase concentric layer 3 closest to the center of the cylindrical reactor while being adjacent to the second liquid-phase concentric layer. As illustrated in FIGS. 2A and 2B according to another non-restrictive embodiment of the present invention, in a case where the first liquid-phase material to a fifth liquid-phase material are sequentially injected into the cylindrical reactor (density: first liquid-phase material>second liquid-phase material>third liquid-phase material>fourth liquid-phase material>fifth liquid-phase material, the first liquid-phase material and the second liquid-phase material are immiscible with each other, the second liquid-phase material and the third liquid-phase material are immiscible with each other, the third liquid-phase material and the fourth liquid-phase material are immiscible with each other, and the fourth liquid-phase material and the fifth liquid-phase material are immiscible with each other), the first liquid-phase material first injected into the cylindrical reactor forms a first liquid-phase concentric layer 1 adjacent to an inner side surface of the cylindrical reactor, the second liquid-phase material second injected into the cylindrical reactor forms a second liquid-phase concentric layer 2 adjacent to the first liquid-phase concentric layer, the third liquid-phase material third injected into the cylindrical reactor forms a third liquid-phase concentric layer 3 adjacent to the second liquid-phase concentric layer, the fourth liquid-phase material fourth injected into the cylindrical reactor forms a fourth liquid-phase concentric layer 4 adjacent to the third liquid-phase concentric layer, and the fifth liquid-phase material last injected into the cylindrical reactor forms a fifth liquid-phase concentric layer 5 closest to the center of the cylindrical reactor while being adjacent to the fourth liquid-phase concentric layer.

It is possible to prevent two miscible liquid-phase concentric layers from being mixed with each other by forming a non-miscible liquid-phase concentric layer between the two miscible liquid-phase concentric layers by a process of sequentially injecting the first liquid-phase material to the n-th liquid-phase material into the cylindrical reactor that is rotating. As a non-restrictive example, two aqueous solution concentric layers having different densities may be isolated from each other by forming an organic liquid-phase concentric layer between the two aqueous solution concentric layers.

Preferably, at least one aqueous solution may be used in the first liquid-phase material to the n-th liquid-phase material, and preferably, at least one aqueous solution concentric layer may be provided in the first liquid-phase concentric layer to the m-th liquid-phase concentric layer. As a non-restrictive example, in a case where a first organic liquid-phase material, an aqueous solution, and a second organic liquid-phase material are sequentially injected into the cylindrical reactor that is rotating (density: first organic liquid-phase material>aqueous solution>second organic liquid-phase material), a first organic liquid-phase concentric layer, an aqueous solution concentric layer, and a second organic liquid-phase concentric layer are sequentially and adjacently formed in order adjacent or close to the inner side surface of the cylindrical reactor.

The liquid-phase material injected into the cylindrical reactor that is rotating may form a liquid-phase concentric layer by forming a layer in a vertical direction toward the bottom surface of the cylindrical reactor. In addition, in the liquid-phase material injected into the cylindrical reactor that is rotating, when a centripetal force due to rotation is superior to a surface tension of the liquid-phase material, it is more advantageous in forming a liquid-phase layer having a concentric shape. Therefore, it is preferable to appropriately adjust a rotational speed of the cylindrical reactor and the surface tension of the liquid-phase material.

In a process of sequentially injecting the liquid-phase materials into the cylindrical reactor that is rotating, an air column may be gradually formed toward a bottom surface of a center of the cylindrical reactor by air bubbles existing in the center of an inner portion of the cylindrical reactor. A column through which external air may flow in a downward direction of the inner portion of the cylindrical reactor may be secured, and a path through which additional liquid-phase materials may be sequentially injected into the cylindrical reactor that is rotating may be smoothly secured, by the air column positioned at the center of the inner portion of the cylindrical reactor. The air column is formed in a substantially vertical direction toward the bottom surface of the center of the cylindrical reactor, and a volume and a thickness of the air column may be adjusted according to a ratio of a volume of all the liquid-phase materials to a volume of the cylindrical reactor. Since the air column has a smaller density than the liquid-phase materials injected into the cylindrical reactor, liquid-phase concentric layers by the liquid-phase materials may be formed around the air column.

The cylindrical reactor is not particularly limited in size as long as an object of the present invention may be achieved, and may have, for example, a diameter of 60 to 200 mm and a height of 5 to 55 mm.

The rotational speed of the cylindrical reactor is preferably 800 rpm or more, and more preferably 900 to 10000 rpm. When the rotational speed of the cylindrical reactor is lower than 800 rpm, it may be difficult for the liquid-phase material to be injected to form a layer in the vertical direction toward the bottom surface of the cylindrical reactor, and it may thus be difficult to form a liquid-phase concentric layer in a smooth form.

A thickness of each of the liquid-phase concentric layers in the cylindrical reactor that is rotating is preferably 150 μm or more, and more preferably 1 to 10 mm. When the thickness of the liquid-phase concentric layer is smaller than 150 μm, stability of the liquid-phase concentric layer is only a metastable state, and thus, a part of the liquid-phase concentric layer may collapse or be broken. Therefore, in order for the liquid-phase concentric layer to have the thickness of 150 μm or more, it is preferable to appropriately adjust a size and a rotational speed of the cylindrical reactor as well as a density of the injected liquid-phase material, a density difference with an adjacent liquid-phase concentric layer, and/or a surface tension of the liquid-phase concentric layer. For example, in a cylindrical reactor having a diameter of 60 to 200 mm and a height of 5 to 55 mm, the density difference with the adjacent liquid-phase concentric layer may be adjusted to 0.1 g/mL or more and the rotational speed may be adjusted to 800 rpm or more to allow the liquid-phase concentric layer to have the thickness of 150 μm or more.

The driving unit rotates the cylindrical reactor around the same axis so as to form the liquid-phase concentric layers in the cylindrical reactor. The driving unit may be, for example, an electric motor.

A mandrel may be provided on a center of a bottom surface of an inner portion of the cylindrical reactor. As illustrated in FIGS. 1A, 1B, 2A, 2B, and 3 according to non-restrictive embodiments of the present invention, a rotary reactor 10 used in a reaction method according to the present invention includes a cylindrical reactor 12; and a driving unit 14 rotating the cylindrical reactor, and may further include a mandrel 13 provided on a center of a bottom surface.

A material of the mandrel may be stainless steel, but is not limited thereto.

When the cylindrical reactor includes the mandrel, the liquid-phase materials may be injected into the cylindrical reactor through injection channels connected to an inlet of the mandrel and embedded into a lower portion of the bottom surface of the cylindrical reactor. According to a non-restrictive embodiment of the present invention, each of the injection channels embedded into the lower portion of the bottom surface of the cylindrical reactor is independently connected to the inlet of the mandrel and is also independently connected to the inner portion of the cylindrical reactor. Therefore, a specific liquid-phase material may be directly loaded into a specific position of the inner portion of the cylindrical reactor through a specific injection channel. According to a non-restrictive example of FIG. 4 (in which a first injection channel and a second injection channel are not illustrated), in a case where a first liquid-phase material to a third liquid-phase material are sequentially injected into the cylindrical reactor (density: first liquid-phase material>second liquid-phase material>third liquid-phase material, the first liquid-phase material and the second liquid-phase material are immiscible with each other, and the second liquid-phase material and the third liquid-phase material are immiscible with each other), a first liquid-phase concentric layer 1, a second liquid-phase concentric layer 2, and a third liquid-phase concentric layer 3 are sequentially formed by sequentially injecting the first liquid-phase material, the second liquid-phase material, and third liquid-phase material into the cylindrical reactor through a first injection channel, a second injection channel, and a third injection channel, respectively. Specifically, the third liquid-phase material is injected into the cylindrical reactor through the third injection channel, and is loaded into a position adjacent to the second liquid-phase concentric layer 2 to form the third liquid-phase concentric layer 3.

Figure 5:
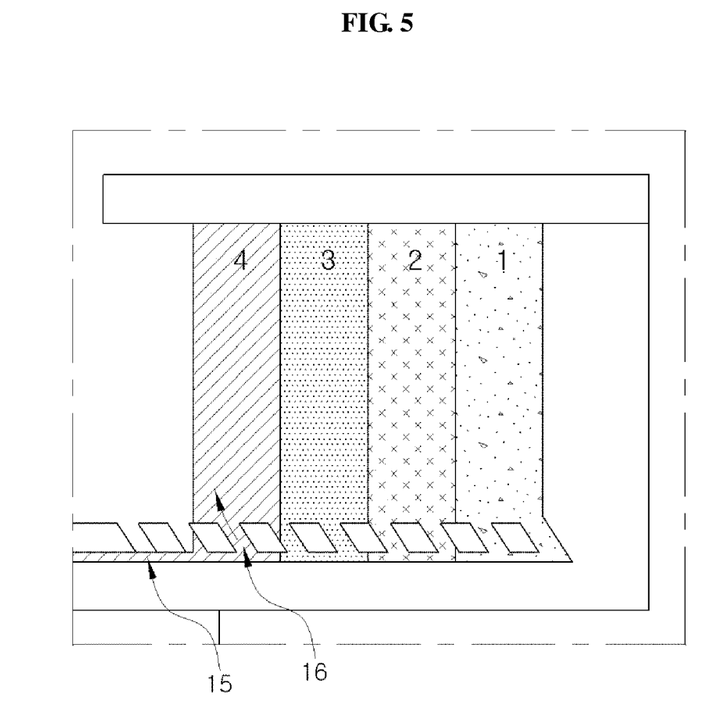
FIG. 5 illustrates a method of injecting a liquid-phase material for forming a liquid-phase concentric layer according to a non-restrictive embodiment of the present invention.

When the cylindrical reactor includes the mandrel, the liquid-phase materials may also be injected into the cylindrical reactor through a main injection channel connected to an inlet of the mandrel and embedded into a lower portion of the bottom surface of the cylindrical reactor and two or more branched injection channels derived from the main injection channel. As illustrated in FIG. 5 according to a non-restrictive embodiment of the present invention, two or more branched injection channels 16 are derived from a main injection channel 15 embedded in the lower portion of the bottom surface of the cylindrical reactor. When a specific liquid-phase material (of which a density is smaller than that of liquid-phase materials injected in the previous order) is injected through the inlet of the mandrel, the specific liquid-phase material passes through a first branched injection channel that is not used by the liquid-phase materials injected in the previous order while passing and flowing through an unfilled portion of the main injection channel, and is then injected into a specific position of the inner portion of the cylindrical reactor. As a non-restrictive example of FIG. 5, a first liquid-phase material to a fourth liquid-phase material are sequentially injected into the cylindrical reactor (density: first liquid-phase material>second liquid-phase material>third liquid-phase material>fourth liquid-phase material, the first liquid-phase material and the second liquid-phase material are immiscible with each other, the second liquid-phase material and the third liquid-phase material are immiscible with each other, and the third liquid-phase material and the fourth liquid-phase material are immiscible with each other). Specifically, the fourth liquid-phase material passes through the first branched injection channel that is not used by the previous three liquid-phase materials while passing and flowing through a portion that is not filled by the previous three liquid-phase materials in the main injection channel, and is then injected into a position adjacent to a third liquid-phase concentric layer 3 in the inner portion of the cylindrical reactor to form a fourth liquid-phase concentric layer 4.

Figure 4:
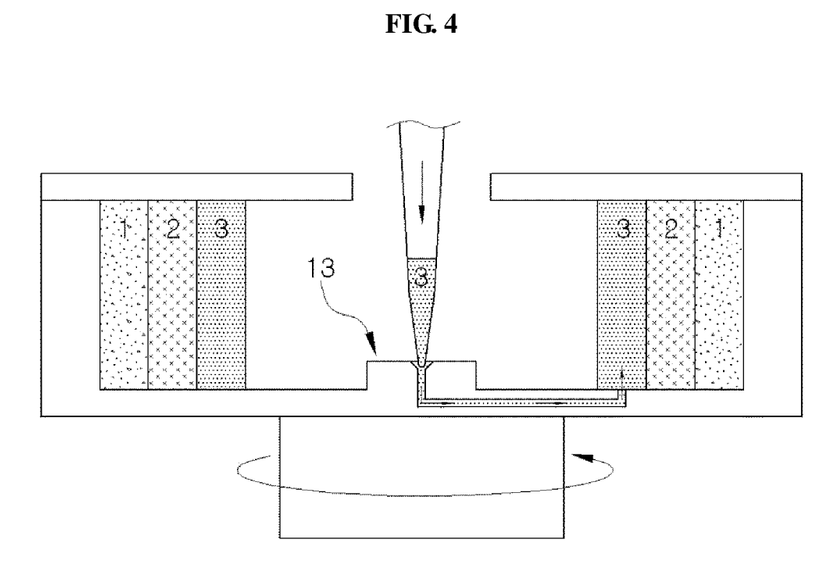
FIG. 4 illustrates a method of injecting a liquid-phase material for forming a liquid-phase concentric layer according to a non-restrictive embodiment of the present invention.
Figure 6:
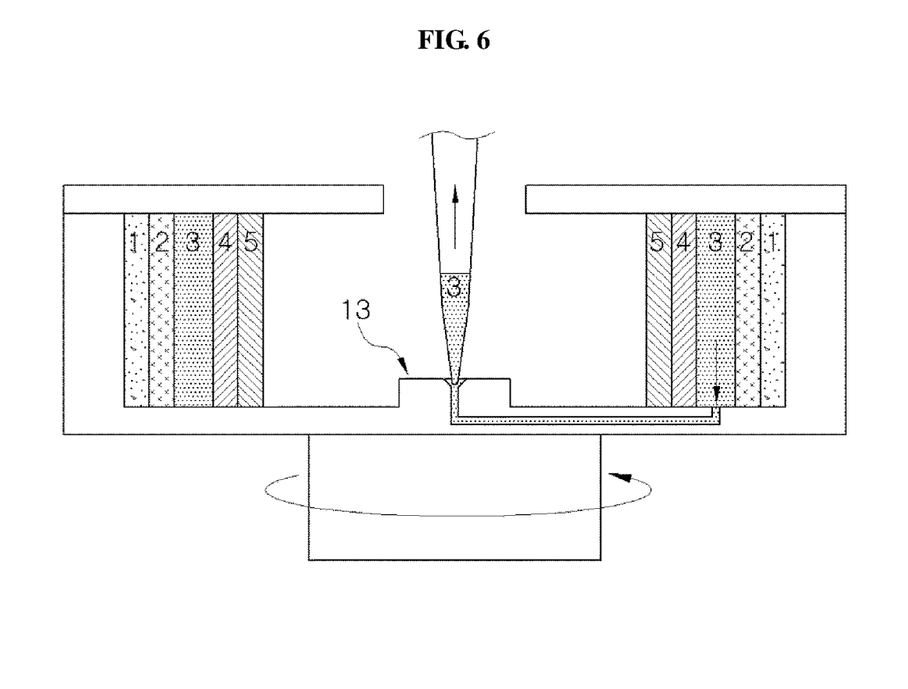
FIG. 6 illustrates an example of applying a modification of extraction to a specific concentric layer of liquid-phase concentric layers according to a non-restrictive embodiment of the present invention.

As in FIG. 4 of the present invention, when each of the injection channels embedded into the lower portion of the bottom surface of the cylindrical reactor is independently connected to the inlet of the mandrel 13 and is also independently connected to the inner portion of the cylindrical reactor, it is also possible to extract some materials included in a specific liquid-phase concentric layer through a specific injection channel. For example, in five liquid-phase concentric layers already formed as in FIG. 6 according to a non-restrictive embodiment of the present invention, some materials included in a third liquid-phase concentric layer 3 may be extracted using a specific third injection channel. In addition, even though a modification of extraction is applied to the specific concentric layer as described above, the entire layered structure of the liquid-phase concentric layers is not damaged.

Figure 7:
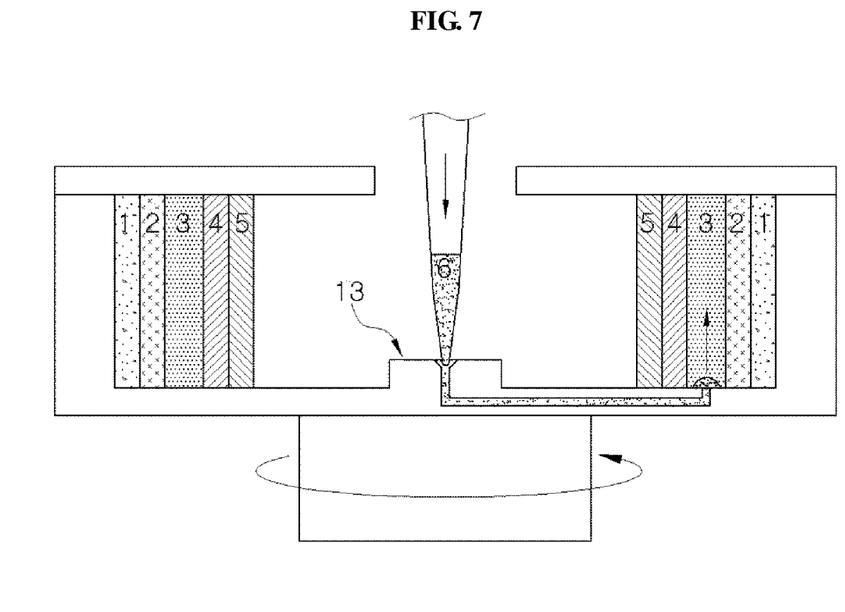
FIG. 7 illustrates an example of applying a modification of miscible material addition to a specific concentric layer of liquid-phase concentric layers according to a non-restrictive embodiment of the present invention.

As in FIG. 4 of the present invention, when each of the injection channels embedded into the lower portion of the bottom surface of the cylindrical reactor is independently connected to the inlet of the mandrel 13 and is also independently connected to the inner portion of the cylindrical reactor, it is also possible to add a specific miscible material to a specific liquid-phase concentric layer through a specific injection channel. For example, in five liquid-phase concentric layers already formed as in FIG. 7 according to a non-restrictive embodiment of the present invention, a sixth liquid-phase material that is miscible and additional may be added to a third liquid-phase concentric layer 3 using a specific third injection channel. In addition, even though a modification of miscible material addition is applied to the specific concentric layer as described above, the entire layered structure of the liquid-phase concentric layers is not damaged.

The reaction method according to the present invention may further include generating a phase transfer between the adjacent liquid-phase concentric layers. In a case where at least one of the liquid-phase materials includes one or more solvents and one or more reactants, it may be more advantageous in generating the phase transfer. Specifically, a reaction product in a specific liquid-phase concentric layer may be transferred into an adjacent liquid-phase concentric layer by diffusion, and the entire layered structure of the liquid-phase concentric layers is not destroyed even by such diffusion transfer. As a non-restrictive example, in a case where the reaction product in the specific organic liquid-phase concentric layer is water-soluble, the water-soluble reaction product may be transferred to an adjacent aqueous solution concentric layer by diffusion. In addition, the phase transfer may be sequentially generated between the liquid-phase concentric layers formed sequentially and adjacently, and the sequential phase transfer may be specifically confirmed by applying an appropriate multistage organic reaction and inorganic reaction to the reaction method according to the present invention.

In addition, in the liquid-phase concentric layers produced by the reaction method according to the present invention, even though the liquid-phase concentric layer itself adjacent to or closest to the inner surface of the cylindrical reactor is extracted, a layered structure by the remaining liquid-phase concentric layers is not damaged or destroyed.

Furthermore, a reaction system including liquid-phase concentric layers formed in a rotary reactor is formed by the reaction method according to the present invention.

The reaction system includes:

a cylindrical reactor that rotates;

a drive unit rotating the cylindrical reactor; and a first liquid-phase concentric layer to an m-th liquid-phase concentric layer (here, m is an integer of 2 or more) sequentially and adjacently formed in order adjacent or close to an inner side surface of the cylindrical reactor, wherein the liquid-phase concentric layers are sequentially and adjacently formed by a centrifugal force due to rotation of the cylindrical reactor by sequentially injecting a first liquid-phase material to an n-th liquid-phase material (here, n is an integer of 2 or more) into the cylindrical reactor that is rotating, the larger the value of n, the smaller the density of the liquid-phase material, the larger the value of m, the smaller the density of the liquid-phase concentric layer, $n - m \geq 0$, the first liquid-phase material and the second liquid-phase material that are sequentially injected are immiscible with each other, and in a case where n is 3 or more, the third liquid-phase material and liquid-phase materials after the third liquid-phase material are miscible or immiscible with a liquid-phase material injected in the previous order, and liquid-phase concentric layers adjacent to each other among the formed liquid-phase concentric layers are immiscible with each other.

EXAMPLE

Hereinafter, the present invention will be described in more detail with reference to the following Examples.

However, the following Examples only exemplify the present invention, and the contents of the present invention are not limited by the following Examples.

Example 1

The rotary reactor as illustrated in FIGS. 1A and 1B was used, and an electric motor was used as the driving unit for rotating the cylindrical reactor (diameter: 73.5 mm and height: 48 mm). Teflon (polytetrafluoroethylene) was used as a material of a side surface and a bottom surface of an inner portion of the cylindrical reactor, and a cylindrical reactor plug made of quartz was silanized with vapor-deposited 1H,1H,2H,2H-perfluorooctyltrichlorosilane. In addition, a mandrel made of stainless steel was used.

The following three liquid-phase materials were used.

TABLE 1

| First liquid-phase material | FC-40 fluorinated liquid 81.5 mL (transparent state, density: 1.855 g/mL) |
|---|---|
| Second liquid-phase material | 66% sucrose aqueous solution 66.5 mL (dyed with yellow color, density: 1.316 g/mL) |
| Third liquid-phase material | n-hexadecane 55 mL (dyed with red color, density: 0.775 g/mL) |

The first liquid-phase material to the third liquid-phase material were sequentially injected into the cylindrical reactor that is rotating, and it was observed whether or not liquid-phase concentric layers were formed according to a change in a rotational speed. In this case, in order to identify the liquid-phase concentric layers to be formed, the first liquid-phase material was kept transparent, the second liquid-phase material was in a state in which it is dyed with a yellow color by a fluorescein sodium salt, and the third liquid-phase material was in a state in which it is dyed with a red color by Oil Red EGN. In a case where the rotational speed was 100 rpm and 300 rpm, the injected liquid-phase materials could not form layers in a vertical direction toward a bottom surface of the cylindrical reactor, such that liquid-phase concentric layers could not be formed in a smooth form.

However, in a case where the rotational speed is 2600 rpm, it was confirmed that a first liquid-phase concentric layer (formed by the first liquid-phase material), a second liquid-phase concentric layer (formed by the second liquid-phase material), and a third liquid-phase concentric layer (formed by the third liquid-phase material) were smoothly formed in order adjacent to an inner side surface of the cylindrical reactor. In this case, a volume of air bubbles existing in a center of an inner portion of the cylindrical reactor was observed to be about 0.66 mL.

Example 2

The rotary reactor as illustrated in FIGS. 1A and 1B was used, and an electric motor was used as the driving unit for rotating the cylindrical reactor (diameter: 120 mm and height: 8 mm). Teflon (polytetrafluoroethylene) was used as a material of a side surface and a bottom surface of an inner portion of the cylindrical reactor, and a cylindrical reactor plug made of quartz was silanized with vapor-deposited 1H,1H,2H,2H-perfluorooctyltrichlorosilane. In addition, a mandrel made of stainless steel was used.

The following four liquid-phase materials were used (density: first liquid-phase material>second liquid-phase material>3'-th liquid-phase material>3"-th liquid-phase material).

TABLE 2

| First liquid-phase material | 0.5M terephthalaldehyde/dichloromethane (DCM) solution (268 mg, 2 mmol/4 mL) |
|---|---|
| Second liquid-phase material | 1.5M potassium carbonate ($K_2CO_3$)/water solution (828 mg, 6 mmol/4 mL) |
| 3'-th liquid-phase material | 1.33M triphenylphosphine ($PPh_3$)/toluene solution (1048 mg, 4 mmol/3 mL) |
| 3"-th liquid-phase material | 4M methyl bromoacetate/toluene solution (93 μL, 4 mmol/1 mL) |

Figure 8:
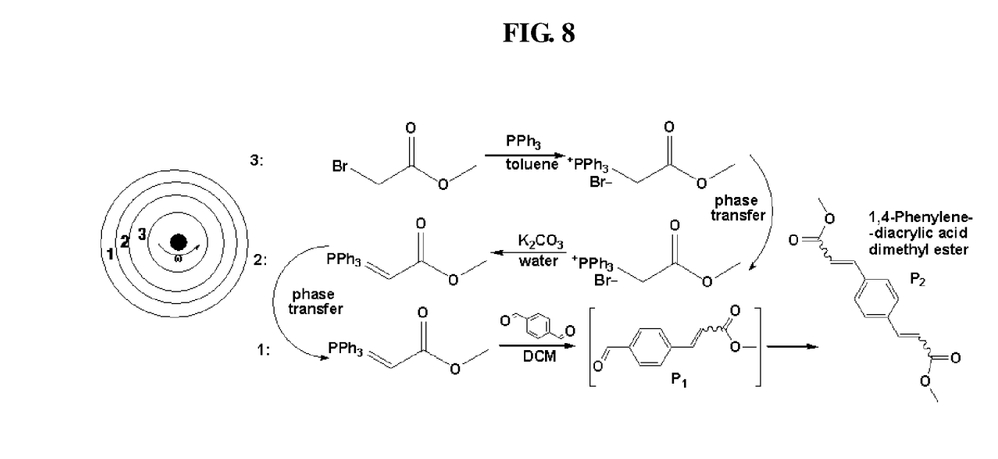
FIG. 8 illustrates a layered structure and a reaction schematic view according to Example 2 of the present invention.

The first liquid-phase material, the second liquid-phase material, the 3'-th liquid-phase material, and the 3"-th liquid-phase material were sequentially injected into the cylindrical reactor rotating at a rotational speed of 1000 rpm. As soon as the 3'-th liquid-phase material and the 3"-th liquid-phase material were injected, liquid-phase concentric layers (3'-th liquid-phase concentric layer and 3"-th liquid-phase concentric layer) by the 3'-th liquid-phase material and the 3"-th liquid-phase material were mixed with each other and merged into one concentric layer (third liquid-phase concentric layer). Therefore, three liquid-phase concentric layers (first liquid-phase concentric layer: DCM layer; second liquid-phase concentric layer: water layer; third liquid-phase concentric layer: toluene layer) were finally formed in the cylindrical reactor (FIG. 8), and a thickness of each of the liquid-phase concentric layers was 1.5 mm. In the third liquid-phase concentric layer closest to a center of the cylindrical reactor that rotates, a white precipitate was formed by a reaction between triphenylphosphine and methyl bromoacetate, which meant the formation of a phosphonium salt, which is a water-soluble material. The water-soluble phosphonium salt was gradually transferred to the second liquid-phase concentric layer (water layer), and a water-insoluble ylide was formed by a reaction between the phosphonium salt and potassium carbonate. The ylide was transferred to the first liquid-phase concentric layer, and a Wittig reaction between the ylide and terephthalaldehyde was performed at room temperature for 72 hours. Thereafter, the reaction was terminated, reaction products of the cylindrical reactor were moved to a separator to separate organic phases, and the separated organic phases were dried and purified. Finally, it was confirmed that a diester product ($P_2$), which is a target compound, was obtained in a yield of 85%, and it was confirmed that a yield of a monoester product ($P_1$), which is a by-product, was only 6% (FIG. 8).

Therefore, the multistage reaction could be efficiently performed in terms of time and space by a phase transfer process in one reactor by applying a known multistage organic reaction to the reaction method and the reaction system according to the present invention.

Example 3

The rotary reactor as illustrated in FIGS. 1A and 1B was used, and an electric motor was used as the driving unit for rotating the cylindrical reactor (diameter: 120 mm and height: 8 mm). Teflon (polytetrafluoroethylene) was used as a material of a side surface and a bottom surface of an inner portion of the cylindrical reactor, and a cylindrical reactor plug made of quartz was silanized with vapor-deposited 1H,1H,2H,2H-perfluorooctyltrichlorosilane. In addition, a mandrel made of stainless steel was used.

The following three liquid-phase materials were used (density: first liquid-phase material>second liquid-phase material>third liquid-phase material).

TABLE 3

| First liquid-phase material | ethyl iodide (1 mL, 12.4 mmol)/tetrachlorethylene (TCE, 4 mL) solution |
|---|---|
| Second liquid-phase material | Potassium carbonate (2.0 g, 14.5 mmol) + tetrabutylammonium bromide (17 mg, 0.05 mmol, 25% mol)/water (5 mL) solution |
| Third liquid-phase material | aminophenol (22 mg, 0.2 mmol) + acetic anhydride (19 μL, 0.2 mmol)/ethyl acetate (5 mL) solution |

Figure 9:
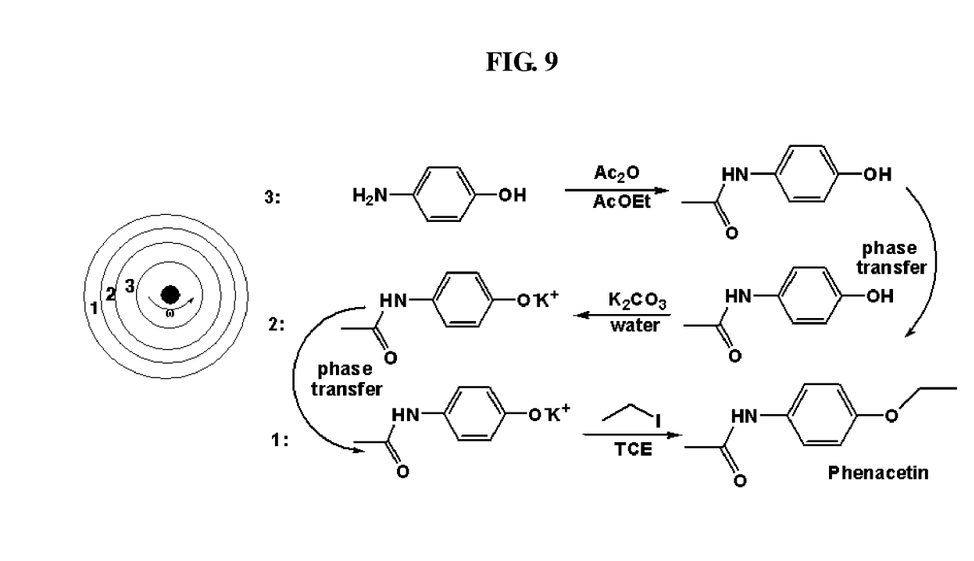
FIG. 9 illustrates a layered structure and a reaction schematic view according to Example 3 of the present invention.

The first liquid-phase material, the second liquid-phase material, and the third liquid-phase material were sequentially injected into the cylindrical reactor rotating at a rotational speed of 1000 rpm. Therefore, three liquid-phase concentric layers (first liquid-phase concentric layer: TCE layer; second liquid-phase concentric layer: water layer; third liquid-phase concentric layer: AcOEt layer) were formed in the cylindrical reactor (FIG. 9), and a thickness of each of the liquid-phase concentric layers was 2 mm. In order to appropriately perform an N-acylation reaction between aminophenol and acetic anhydride ($Ac_2O$) in the third liquid-phase concentric layer, the cylindrical reactor that rotates was once maintained at room temperature for 2 hours. Thereafter, a temperature of the cylindrical reactor was raised to 40° C. and maintained for 22 hours, and the N-acylation reaction product was then transferred to the second liquid-phase concentric layer (water layer). A phenolic hydroxyl group of the N-acylation reaction product was deprotonated by a reaction between the N-acylation reaction product and potassium carbonate. The deprotonated reaction product was transferred to the first liquid-phase concentric layer under the mediation of tetrabutylammonium bromide (TBAB), and phenacetin (N-(4-ethoxyphenyl)acetamide) was formed in the first liquid-phase concentric layer by a reaction between the deprotonated reaction product and ethyl iodide (FIG. 9). Thereafter, the reaction was terminated, reaction products of the cylindrical reactor were moved to a separator to separate organic phases, and the separated organic phases were dried and purified. Finally, it was confirmed that phenacetin, which is a target compound, was obtained in a yield of 37%.

Therefore, phenacetin known as a pain relief and fever relief drug could also be efficiently synthesized in terms of time and space by the reaction method and the reaction system according to the present invention.

The invention claimed is:

1. A reaction method using a rotary reactor including a cylindrical reactor; and a drive unit rotating the cylindrical reactor, comprising:
sequentially and adjacently forming a first liquid-phase concentric layer to an m-th liquid-phase concentric layer in order adjacent to an inner side surface of the cylindrical reactor by a centrifugal force due to rotation of the cylindrical reactor by sequentially injecting a first liquid-phase material to an n-th liquid-phase material into the cylindrical reactor that is rotating,
wherein
m is an integer of 2 or more, and n is an integer of 2 or more,
the larger the value of n, the smaller the density of the n-th liquid-phase material,
the larger the value of m, the smaller the density of the m-th liquid-phase concentric layer, $n-m \geq 0$, the first liquid-phase material and the second liquid-phase material that are sequentially injected are immiscible with each other, and in a case where n is 3 or more, the third liquid-phase material and liquid-phase materials after the third liquid-phase material are miscible or immiscible with a liquid-phase material injected in the previous order, and
liquid-phase concentric layers adjacent to each other among the formed liquid-phase concentric layers are immiscible with each other.

2. The reaction method of claim 1, wherein the respective liquid-phase materials independently comprise one or more solvents, or comprise one or more solvents and one or more reactants.

3. The reaction method of claim 1, wherein at least one aqueous solution is used in the first liquid-phase material to the n-th liquid-phase material, and at least one aqueous solution concentric layer is provided in the first liquid-phase concentric layer to the m-th liquid-phase concentric layer.

4. The reaction method of claim 1, wherein the cylindrical reactor has a diameter of 60 to 200 mm and a height of 5 to 55 mm.

5. The reaction method of claim 1, wherein a rotational speed of the cylindrical reactor is 800 rpm or more.

6. The reaction method of claim 1, wherein a thickness of each of the liquid-phase concentric layers is 150 μm or more.

7. The reaction method of claim 1, wherein a mandrel is provided on a center of a bottom surface of an inner portion of the cylindrical reactor.

8. The reaction method of claim 7, wherein the liquid-phase materials are injected into the cylindrical reactor through injection channels connected to an inlet of the mandrel and embedded into a lower portion of the bottom surface of the cylindrical reactor.

9. The reaction method of claim 7, wherein the liquid-phase materials are injected into the cylindrical reactor through a main injection channel connected to an inlet of the mandrel and embedded into a lower portion of the bottom surface of the cylindrical reactor and two or more branched injection channels derived from the main injection channel.

10. The reaction method of claim 1, further comprising generating a phase transfer between the adjacent liquid-phase concentric layers.

11. A reaction system including liquid-phase concentric layers formed within a rotary reactor, comprising:
a cylindrical reactor that rotates;
a drive unit rotating the cylindrical reactor; and
a first liquid-phase concentric layer to an m-th liquid-phase concentric layer sequentially and adjacently formed in order adjacent to an inner side surface of the cylindrical reactor,
wherein
the liquid-phase concentric layers are sequentially and adjacently formed by a centrifugal force due to rotation of the cylindrical reactor by sequentially injecting a first liquid-phase material to an n-th liquid-phase material into the cylindrical reactor that is rotating,
m is an integer of 2 or more, and n is an integer of 2 or more, the larger the value of n, the smaller the density of the n-th liquid-phase material, the larger the value of m, the smaller the density of the m-th liquid-phase concentric layer, $n-m \geq 0$, the first liquid-phase material and the second liquid-phase material that are sequentially injected are immiscible with each other, and in a case where n is 3 or more, the third liquid-phase material and liquid-phase materials after the third liquid-phase material are miscible or immiscible with a liquid-phase material injected in the previous order, and liquid-phase concentric layers adjacent to each other among the formed liquid-phase concentric layers are immiscible with each other.

* * * * *